United States Patent [19]

Blackwell

[11] 3,856,560

[45] Dec. 24, 1974

[54] ARYLENE SULFIDE POLYMER COATING COMPOSITIONS

[75] Inventor: Jennings P. Blackwell, Bartlesville, Okla.

[73] Assignee: Phillips Petroleum Company, Bartlesville, Okla.

[22] Filed: Aug. 15, 1973

[21] Appl. No.: 388,598

Related U.S. Application Data

[62] Division of Ser. No. 177,130, Sept. 1, 1971, Pat. No. 3,776,880.

[52] U.S. Cl........ 117/132 B, 117/132 CF, 161/216, 161/247, 260/37 R, 260/79, 260/900
[51] Int. Cl...................... B32b 15/08, B32b 27/06
[58] Field of Search... 117/132 C, 132 CF, 161 UN, 117/161 UZ; 260/37 R, 79, 6

[56] References Cited
UNITED STATES PATENTS

| | | | |
|---|---|---|---|
| 3,492,125 | 1/1970 | Ray | 117/127 X |
| 3,524,835 | 8/1970 | Edmonds et al. | 260/79 X |
| 3,622,376 | 11/1971 | Tieszen et al. | 260/79 UX |
| 3,728,313 | 4/1973 | Hill et al. | 260/79 |
| 3,801,379 | 4/1974 | Blackwell | 117/132 C X |

Primary Examiner—George F. Lesmes
Assistant Examiner—Alan T. McDonald

[57] ABSTRACT

Adherent coatings of arylene sulfide polymers are formed by applying to substrates a mixture of an arylene sulfide polymer and selected nitrogenous organic compounds. The arylene sulfide polymer-nitrogen-containing organic compound mixture is preferably applied as a slurry to a substrate in a carrier liquid, such as ethylene glycol, methyl alcohol, water, toluene, and the like or mixtures thereof, and thereafter heated to form a coating.

7 Claims, No Drawings

ARYLENE SULFIDE POLYMER COATING COMPOSITIONS

This is a divisional application of my copending application having Ser. No. 177,130, filed Sept. 1, 1971, now U.S. Pat. No. 3,776,880 entitled "Arylene Sulfide Polymer Coating Compositions."

This invention relates to improved arylene sulfide polymer coatings. In accordance with another aspect, this invention relates to normally solid arylene sulfide polymer coating compositions containing selected nitrogenous organic compounds. In accordance with a further aspect, this invention relates to improved phenylene sulfide polymer coatings containing at least one nitrogenous organic compound applied as a slurry in a carrier liquid to a metal substrate and heated at an elevated temperature and for a period of time sufficient to fuse and cure said polymer.

Arylene sulfide polymers such as phenylene sulfide polymers are well known in the art for their high temperature stability. Although it is known in the art that these polymers can be adhered to metal substrates, under certain conditions there sometimes are formed microscopic voids between the substrate and the polymer coating and surface imperfections which cannot be necessarily be detected by ordinary means, but which have an effect on the ultimate value of the coated article as an item of commerce. For instance, a coated metallic item on which the coating is stuck tenaciously throughout most of the interface is still unsuitable as a protective coating for certain uses if there are microscopic areas where the protective coating is not intimately adhered, thus forming points for separation of the coating and the initiation of corrosion. Furthermore, in applications such as nonstick coatings for cooking utensils for which phenylene sulfide polymers and the like should be ideally suited because of their temperature stability and exceptional hardness, a surface is desirable which is not only glossy to the appearance but which does not even contain microscopic voids or surface imperfections.

It has been the subject of considerable research to find methods of improving the bonding of coatings of arylene sulfide polymers to substrates which are to be protected. One of these methods which has been highly successful has involved the incorporation of titanium dioxide into the coating composition.

I have now found that even better coatings of arylene sulfide polymers can be formed by incorporating into the coating a nitrogenous organic compound. Coating containing these materials can also contain titanium dioxide to provide even superior coatings.

It is an object of this invention to provide an improved coating to an arylene sulfide polymer.

Another object of this invention is to provide an improved method of applying coatings of arylene sulfide polymers to substrates.

A further object of this invention is to provide an improved high temperature coating composition.

A further object of this invention is to provide a coating free of microscopic imperfections which coating is uniformly adhered to a substrate.

In accordance with this invention, a minor amount of at least one nitrogenous organic compound is incorporated into an arylene sulfide polymer and this mixture is applied as a coating to a substrate.

Further in accordance with the invention, a metal substrate is coated with a slurry comprising an arylene sulfide polymer and a finite amount up to 50 weight percent, based on polymer, of at least one nitrogenous organic compound, followed by heating at an elevated temperature for a period of time sufficient to fuse and cure the arylene sulfide polymer.

It has been found that the addition of at least one nitrogenous organic compound, as defined herein, to arylene sulfide polymer coating compositions results in coatings having improved adhesion or smoothness upon fusion and curing.

Specific nitrogenous organic compounds effective in improving the adhesion or smoothness of coatings comprising arylene sulfide polymers include melamine, hexamethylenetetramine, benzothiazole, 1H-benzotriazole or casein or ammonium salt of casein. Mixtures of these nitrogenous compounds can be employed.

Applicable arylene sulfide polymers include polymers of the type which are prepared as described in U.S. Pat. No. 3,354,129. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthylene, biphenylene ether, or a lower alkyl-substituted derivative thereof. By "lower alkyl" is meant alkyl groups having 1 to 6 carbon atoms such as methyl, ethyl, propyl, isobutyl, hexyl, and the like. Preferably the arylene sulfide polymers have melting temperatures within the range of about 400°–900°F. If desired, the arylene sulfide polymer can be lightly cured, i.e., the molecular weight of the polymer can be increased by crosslinking or chain extension, e.g., by heating moderately, prior to application to the substrate.

With the exception of benzothiazole, the nitrogenous compound should be employed in an amount of about 2–50, preferably 3–40, parts by weight per 100 parts of arylene sulfide polymer. To achieve satisfactory results benzothiazole, when used, should be employed in an amount of at least 15 parts by weight per 100 parts of arylene sulfide polymer.

The diluent or carrier liquid used as a component of the slurry can be any liquid inert to the other components of the slurry and to the substrate, provided it can be readily volatilized prior to or during the subsequent heating or curing step. The diluent presently preferred is water. Other diluents which can be used include alcohols such as ethylene glycol, methyl alcohol, ethyl alcohol, and isopropyl alcohol, and hydrocarbon such as benzene, toluene, heptane, cyclohexane, and various hydrocarbon mixtures such as kerosene, diesel fuel, and the like. Mixtures of such diluents can be employed.

The concentration of the polymer in the diluent depends upon the coating application and whether or not additional solids, besides the nitrogenous compound, are employed. As a practical matter, the slurry should not be so dilute that the polymer particles are not closely enough associated on deposit on the surface to permit them to fuse together on melting. On the other hand, the thickness of the slurry and its ease of application will impose a practical upper limit on the solids concentration. Generally a solids content of about 10–60 weight percent can be used. In addition to the arylene sulfide polymer and the nitrogenous compound, other substances can be incorporated into the slurry, such as other polymers, e.g., poly(tetrafluoroethylene); pigments, e.g., titanium dioxide, ferric oxide, cobaltic oxide, or molybdenum disulfide; fillers; surfactants; and the like.

The slurry can be applied to the substrate without prior heat treatment of the substrate, or the substrate can be heated prior to or during application of the slurry to temperatures as high as 600°–800°F.

Any surface that can be heated to the coating temperature necessary to fuse the arylene sulfide polymer can be coated by the procedure of this invention. In general, the articles which are coated are those in which the surfaces are formed of thermally stable polymeric materials or substances such as metal, glass, ceramic, or stone. Preferably, metals such as copper, aluminum, iron, titanium, and chromium or metal alloys such as steel are used.

After the coating is applied, it is desirable to cure the coating, i.e., increase the molecular weight of the arylene sulfide polymer by crosslinking or chain extension, by heating at an elevated temperature, preferably in the range of about 500°–900°F, in an oxygen-containing atmosphere, such as air, for about 5 minutes to 24 hours or more. The thickness of the coating can be increased by additional applications following the same procedure after each curing period. The slurry can be applied by any procedure such as by spraying the slurry onto the surface or by flowing the slurry over the surface.

In order to obtain the improved coatings provided by the process of this invention, the thickness of the cured coating should be at least 2 mils and can be as much as 50 mils or more, with the proviso that when copper is used as the substrate, the thickness of the cured coating should be at least 3½ mils.

To produce the coated or laminated structure, the substrate as used in the present invention can be in any shape desired, including sheeting, wire, coupons, blanks, objects which have been molded, carved, or otherwise formed into specific shapes, and the like.

EXAMPLE

In each of a series of experiments, a metal coupon was coated with an aqueous slurry comprising 100 parts by weight of poly(P-phenylene sulfide) (PPS) in 225–300 parts by weight of water containing 1 weight percent Triton x-100 surface active agent. Each slurry was prepared by ball milling these ingredients, together with any other component such as nitrogenous compound within the scope of this invention, pigment, or poly(tetrafluoroethylene) for 6–18 hours. The coated coupon was heated at 700°F for 30 minutes to cure the arylene sulfide coating, i.e., increase the molecular weight of the arylene sulfide by crosslinking and/or chain extension, after which the coating was evaluated. In runs 1–25 the metal coupon was copper; in runs 26–27 the metal coupon was aluminum. The runs and observations made are summarized in the following table.

TABLE

| Run No. | Additive (parts by weight/100 parts PPS) | | Cured Coating | | Bend Test(a) | Reverse Impact Test(b) |
|---|---|---|---|---|---|---|
| | Pigment | Nitrogenous Compound | Thickness Mils | Appearance | | |
| 1 | TiO$_2$ (33) | Melamine (10) | 5 | Good, smooth | No cracks | No cracks |
| 2 | TiO$_2$ (33) | None | 5 | Mottled, incomplete coverage | Cracks | Cracks |
| 3 | TiO$_2$ (25) | Melamine (7.5) | 4 | Good | No cracks | No cracks |
| 4 | TiO$_2$ (25) | None | 5 | Poor coverage | Cracks | Cracks |
| 5 | TiO$_2$ (33) | Melamine (17) | 4 | Good, smooth | No cracks | No cracks |
| 6 | TiO$_2$ (33) | Melamine (24) | 4 | Good, smooth | No cracks | No cracks |
| 7 | TiO$_2$ (33) | Melamine (33) | 4 | Good, smooth | No cracks | No cracks |
| 8(c) | TiO$_2$ (33) | Melamine (10) | 5 | Good, smooth | No cracks | No cracks |
| 9(c) | TiO$_2$ (33) | Melamine (10) | 7 | Good, smooth | No cracks | No cracks |
| 10 | Fe$_2$O$_3$ (33) | Melamine (10) | 5 | Good, smooth | No cracks | No cracks |
| 11 | Fe$_2$O$_3$ (33) | None | —(d) | Very poor coverage, with bare metal | —(d) | Cracks |
| 12 | None | Melamine (33) | —(d) | Good | No cracks | No cracks |
| 13 | None | Melamine (13) | —(d) | Good | No cracks | No cracks |
| 14(e) | None | Melamine (10) | 4 | Good | No cracks | No cracks |
| 15(c)(e) | None | Melamine (10) | 7 | Good | No cracks | No cracks |
| 16 | TiO$_2$ (33) | None | 4 | Very poor, with many pinholes and craters | Cracks | Cracks |
| 17 | TiO$_2$ (33) | Melamine (10) | 4½ | Smooth, glossy | No cracks | No cracks |
| 18 | TiO$_2$ (33) | Casein (10) (f) | 4 | Even, flat, dark | No cracks | No cracks |
| 19 | TiO$_2$ (33) | Casein (3) (f) | 4 | Smooth, dark | No cracks | No cracks |
| 20 | TiO$_2$ (33) | Hexamethylenetetramine (10) | 5 | Mottled | No cracks | No cracks |
| 21(g) | TiO$_2$ (33) | Hexamethylenetetramine (33) | —(d) | Good, but with some small dents | No cracks | No cracks |
| 22 | None | Hexamethylenetetramine (13) | —(d) | Dark, Smooth, glossy | No cracks | No cracks |
| 23 | None | Hexamethylenetetramine (33) | —(d) | Dark and glossy, a few bare spots | No cracks | No cracks |
| 24(h) | TiO$_2$ (33) | Benzothiazole (33) | —(d) | Incomplete coverage | No cracks | No cracks |

TABLE – Continued

| Run No. | Additive (parts by weight/100 parts PPS) | | Cured Coating | | Bend Test(a) | Reverse Impact Test(b) |
|---|---|---|---|---|---|---|
| | Pigment | Nitrogenous Compound | Thickness Mils | Appearance | | |
| 25 | TiO$_2$ (33) | 1H-Benzotriazole (10) | 3½ | Poor, with pinholes and craters | No cracks | No cracks |
| 26 | TiO$_2$ (33) | Melamine (10) | 2½ | Smoother, with fewer craters, than from similar formulations in the absence of nitrogenous compound | No cracks | No cracks |
| 27 | TiO$_2$ (33) | Casein (10)(f) | 2½ | | No cracks | No cracks |

Footnotes to Table:
(a) Mandrel Bend Test. The coupon is bent to a 90° angle, and the resulting cured surface is examined for cracks.
(b) Gardner Laboratories Reverse Impact Test. The equipment used comprises a rounded tip which rests above the sample on the reverse side from the coating. A 4-pound ram is raised 40 inches and dropped against the tip, which then impinges on the back side of the coated coupon. The side opposite that which comes in contact with the tip, i.e., the side having the coating, is examined for cracks and looseness of the coating.
(c) Formulation was applied as two coats, each, cured 30 minutes at 700°F.
(d) Not determined.
(e) PPS was heated for about 6 hours at approximately 500°F prior to preparation of slurry.
(f) Sufficient ammonium hydroxide was added to dissolve the casein.
(g) Slurry contained 13 parts by weight poly(tetrafluoroethylene) per 100 parts of PPS.
(h) About 140 parts by weight of water per 100 parts of PPS was used in preparation of slurry.

As the above table indicates, the presence of a nitrogenous compound, as shown, in the slurry applied to the substrate results in a coating which, upon curing, exhibits improved adhesion and/or smoothness as compared with a coating prepared similarly from a slurry containing no nitrogenous compound.

I claim:

1. A coated structure comprising a substrate having bonded thereto a coating composition comprising a poly(arylene sulfide) resin and a finite amount up to 50 weight percent, based on resin, of at least one nitrogenous organic compound selected from melamine, hexamethylenetetramine, benzothiazole, 1H-benzotriazole, casein, and an ammonium salt of casein, and mixtures thereof.

2. A coated structure according to claim 1 wherein said resin is poly(phenylene sulfide) and said substrate is a metal.

3. A coated structure according to claim 2 wherein said metal is copper or aluminum.

4. A coated structure according to claim 1 wherein said polymeric composition contains, in addition, a minor amount of titanium dioxide or ferric oxide and poly(tetrafluoroethylene).

5. A coated structure according to claim 1 wherein said resin is poly(phenylene sulfide) and the amount of said nitrogenous organic compound present is from 3 to 40 weight percent.

6. A coated structure according to claim 1 wherein said polymeric coating composition is poly(phenylene sulfide), melamine and a minor amount of titanium dioxide or ferric oxide.

7. A coated structure according to claim 1 wherein said polymeric coating composition is poly(phenylene sulfide), hexamethylenetetramine and a minor amount of titanium dioxide and poly(tetrafluoroethylene).

* * * * *